United States Patent [19]

Moan

[11] Patent Number: 4,476,745
[45] Date of Patent: Oct. 16, 1984

[54] CONTROL SYSTEM FOR AN AUTOMATIC TRANSMISSION HAVING A NEUTRAL COAST AND IDLE FEATURE

[75] Inventor: Richard D. Moan, Livonia, Mich.

[73] Assignee: Ford Motor Company, Dearborn, Mich.

[21] Appl. No.: 301,790

[22] Filed: Sep. 14, 1981

[51] Int. Cl.³ .................. B60K 41/18; B60K 41/16
[52] U.S. Cl. .................................. 74/866; 74/870; 74/869; 74/868; 192/0.075
[58] Field of Search ............ 74/869, 868, 867, 866, 74/870; 192/0.075, 0.076, 0.077, 0.096

[56] References Cited

U.S. PATENT DOCUMENTS

| | | | |
|---|---|---|---|
| 2,839,944 | 6/1958 | Von Rucker | 74/870 |
| 2,875,634 | 3/1959 | Gelenius et al. | 192/0.096 |
| 3,303,912 | 2/1967 | Fujimoto et al. | 192/0.032 |
| 3,395,617 | 8/1968 | Kaptur | 192/0.032 |
| 3,656,600 | 4/1972 | Kitano et al. | 192/0.075 |
| 3,698,525 | 10/1972 | Grassmuck | 192/0.075 |
| 4,265,346 | 5/1981 | Emmadi | 192/0.096 |
| 4,347,765 | 9/1982 | Leonard et al. | 74/869 |

FOREIGN PATENT DOCUMENTS

| | | | |
|---|---|---|---|
| 2609213 | 9/1977 | Fed. Rep. of Germany | 192/0.075 |
| 0076224 | 6/1980 | Japan | 192/0.096 |
| 0100453 | 7/1980 | Japan | 192/0.096 |
| 0149453 | 11/1980 | Japan | 74/869 |

Primary Examiner—Allan D. Herrmann
Assistant Examiner—D. Wright
Attorney, Agent, or Firm—Donald J. Harrington; Keith L. Zerschling

[57] ABSTRACT

A control circuit for an automatic power transmission mechanism for use with an internal combustion engine in a vehicle driveline including fluid pressure operated clutches and brakes that are applied selectively to effect various ratio changes, a forward clutch being applied to effect a forward driving mode and being released to effect a neutral condition, and a clutch pressure regulator valve assembly for controlling distribution of actuating pressure to the forward clutch whereby the clutch pressure is regulated at a threshold value to effect minimum frictional engagement during coasting operation of the vehicle and during engine idling wherein provision is made for quickly increasing the pressure in the forward clutch to establish a maximum torque capacity when the coasting and idling mode is interrupted at the onset of driving torque delivery through the driveline thereby effecting a smooth transition from the coasting and idling condition to the driving mode.

3 Claims, 5 Drawing Figures

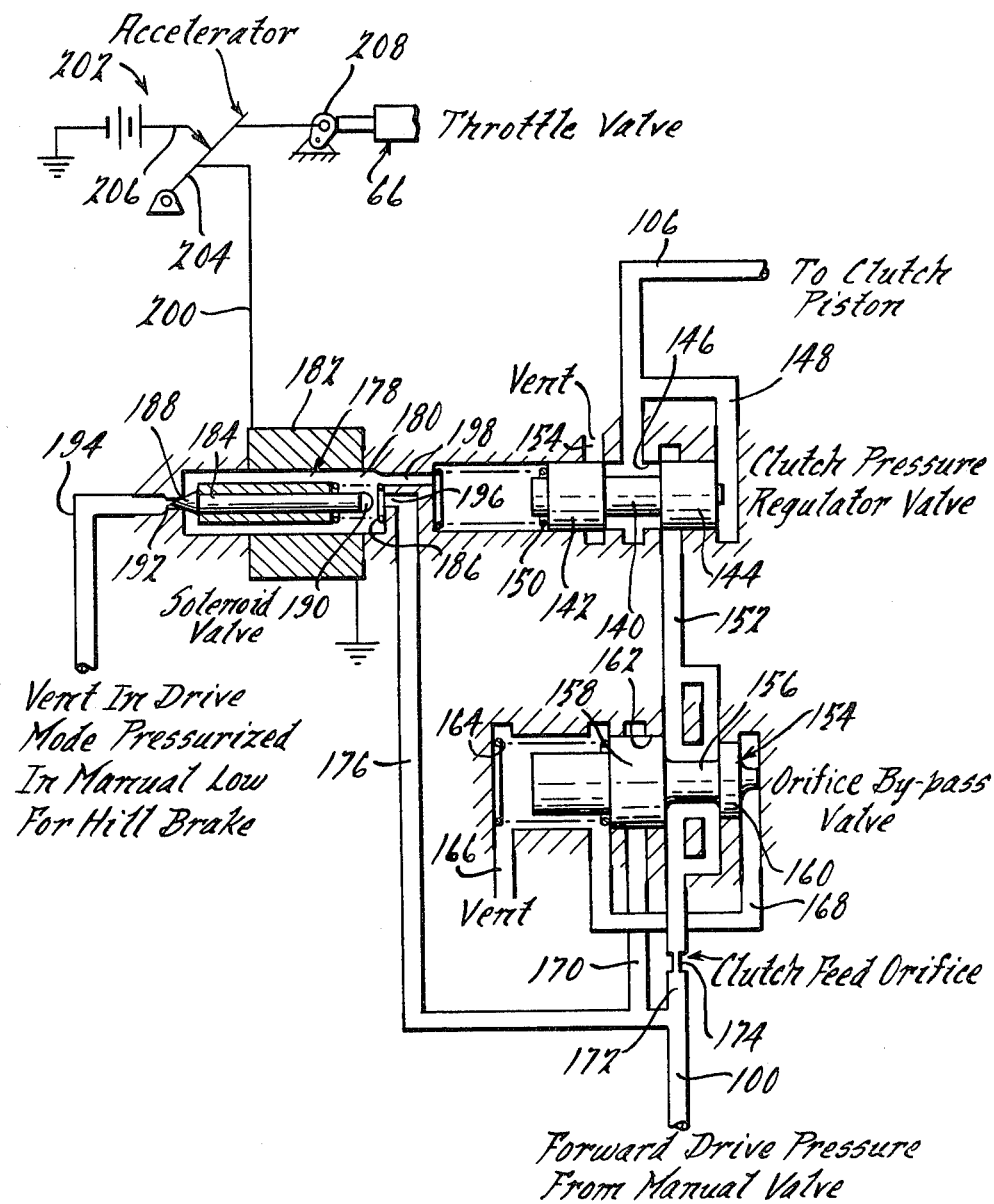

CONTROL SYSTEM FOR AN AUTOMATIC TRANSMISSION HAVING A NEUTRAL COAST AND IDLE FEATURE

GENERAL DESCRIPTION OF THE INVENTION

My invention comprises improvements in a control circuit for an automatic power transmission mechanism of the kind shown, for example, in application Ser. No. 82,399, filed Oct. 5, 1979 now U.S. Pat. No. 4,347,765 by A. S. Leonard et al. That application is assigned to the assignee of this invention.

The automatic power transmission mechanism disclosed in the Leonard et al. application comprises planetary gearing and a hydrokinetic torque converter arranged to establish four forward driving ratios and a single reverse ratio, the fourth ratio being an overdrive. Ratio changes are effected automatically by the automatic control valve system which includes fluid pressure operated brakes and clutches.

The control circuit comprises a positive displacement pump driven by the vehicle engine driven impeller of the torque converter. A driver controlled throttle valve in the transmission circuit is connected mechanically to the carburetor throttle valve for the engine so that the control circuit may receive from the throttle valve a throttle pressure signal that is generally related to the engine throttle setting, which in turn is related generally to engine torque.

The control circuit includes shift valves for effecting changes in ratio. The shift valves respond to changes in throttle pressure as well as to changes in a speed signal from a fluid pressure governor connected to the transmission power output shaft.

The improvement of my invention makes possible an improvement in fuel economy by forcing the control system to assume a neutral condition when the engine is idling or when the vehicle is coasting. Under normal circumstances when the forward clutch is disengaged to effect a neutral condition during coasting or idling, an undesirable delay occurs when the driver opens the throttle to continue the normal driving mode since the clutch is engaged only after a delay. During that delay the engine speed increases and when the clutch finally engages the high engine speed causes a surge or a harshness in engagement of the clutch. My improved control circuit overcomes this problem; that is, when the throttle is closed, the linkage causes a clutch pressure regulator valve to assume a threshold pressure within the forward clutch even after the coasting mode begins or even after the engine is idling. This causes the clutch disc of the forward driving clutch to become frictionally engaged with a minimum torque capacity so that free-play in the clutch mechanism is eliminated.

When the driver advances the engine carburetor throttle to continue acceleration or operation under torque, the function of the clutch regulator valve is overruled thereby allowing the clutch piston capacity to increase instantly as line pressure is distributed to the clutch, thereby effecting full clutch engagement. The normal time delay required to move the piston and to compensate for take-up clearances is eliminated since the clutch regulator valve produces enough pressure to take up the clearances without full engagement of the clutch.

A further feature of my invention is the quick application of the clutch during normal clutch engagement as the driver effects a change in the driving mode from the neutral condition to the automatic driving mode. When the operator effects a drive ratio change from a neutral to the automatic driving mode with the engine throttle slightly opened, the usual flow restricting orifice in the feed passage for the forward clutch is bypassed. The control orifice in the feed passage for the forward clutch thus cushions engagement of the forward clutch when the transmission is shifted from the neutral mode to the drive mode. After the drive mode is achieved, a bypass valve in the clutch feed circuit permits forward drive pressure to hold the bypass valve in the driving condition until the driver again selects the neutral condition.

If hill braking is desired, the operator may shift the transmission to a manual low or manual second condition in which case provision is made for overruling the operation of the clutch pressure regulator valve.

BRIEF DESCRIPTION OF THE FIGURES OF THE DRAWINGS

FIG. 4 is a subcircuit representing a portion of the circuit of FIGS. 3A and 3B and which includes a clutch pressure regulator valve and an orifice bypass valve for controlling the forward clutch.

PARTICULAR DESCRIPTION OF THE INVENTION

Figure 1:
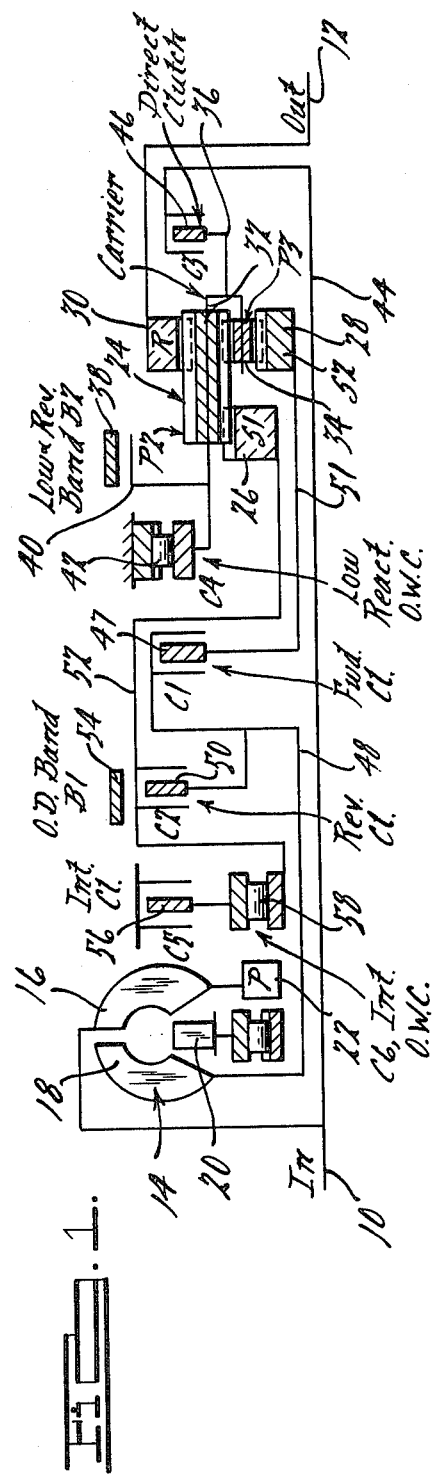
FIG. 1 is a schematic representation of a transmission mechanism that comprises planetary gear elements controlled by fluid operated clutches and brakes.

In FIG. 1 reference numeral 10 designates generally a crankshaft for an internal combustion engine. Reference numeral 12 designates a power output shaft that is adapted to be connected to the vehicle traction wheels in a vehicle driveline through a differential-and-axle assembly. The hydrokinetic torque converter 14 includes bladed impeller 16, bladed turbine 18 and bladed stator 20 arranged in the usual fashion in a hydrokinetic torus circuit. The impeller 16 is connected drivably through a driveplate and damper assembly to the crankshaft 10. The positive displacement pump 22 is driven by the impeller. It forms a pressure source for the control circuit that will be described with reference to FIGS. 3A and 3B.

Planetary gearing is shown at 24. It includes a pair of sun gears 26 and 28, the pitch diameter of the former being larger than the pitched diameter of the latter. A ring gear 30 engages long planet pinions 32 which in turn drivably engage sun gear 26 and short planet pinions 34. Sun gear 28 drivably engages pinions 34. Pinions 32 and 34 are journalled on a common carrier 36 and mesh with each other.

Carrier 36 is adapted to be braked during low speed ratio operation and reverse drive operation by a brake band 38 which is operated by a fluid pressure operated servo that will be described with reference to FIG. 3B. It encircles brake drum 40 connected to the carrier 36. Carrier 36 is adapted to be braked also by a low speed reaction brake in the form of a one way coupling 42 which is effective to distribute reaction torque to the stationary transmission housing but which permits freewheeling motion of the carrier during operation in the second, third and fourth speed ratios.

Carrier 36 is adapted to be clutched to a central torque delivery shaft 44 through a high speed ratio clutch 46 that is selectively engageable by a fluid pressure operated clutch and cylinder to be described with reference to FIG. 3B. Ring gear 30 is connected directly to power output shaft 12.

Torque delivery shaft 44 forms a direct mechanical connection between the crankshaft 10 and the clutch 46 so that when the clutch 46 is applied engine torque is distributed directly to the carrier 36 to effect an overdrive condition or to effect a split-torque delivery condition when the transmission is operating in the third speed ratio.

Forward clutch 47 is adapted to connect turbine shaft 48 to sun gear sleeve shaft 50, the latter being connected to the small sun gear 28. Turbine shaft 48 is connected directly to the turbine 18. Clutch 47 is applied during operation in the first, second and third forward driving ratios; but it is disengaged during operation in overdrive and reverse drive.

Reverse clutch 50 is adapted to connect the sleeve shaft 48 to brake drum 52 during operation in reverse drive, clutch 52 in turn being connected to the large sun gear 26.

Brake drum 52 is surrounded by overdrive brake band 54 which is applied during overdrive operation thus anchoring large sun gear 26 so that it may act as a reaction point as torque is transferred through the clutch 46 to the carrier 36.

Intermediate speed ratio coupling or brake 56 is connected through an overrunning coupling 58 to the brake drum 52. Thus sun gear 26 is adapted to be anchored during intermediate speed ratio operation by the overrunning coupling 58 and the engaged coupling 56. The servos for operating the brake band 54 and the coupling 56 will be described with reference to FIG. 3A.

Figure 2:
FIG. 2 is a chart that shows the clutch and brake engagement and release pattern for the transmission of FIG. 1 for effecting the various ratio changes between the four forward driving ratios and the reverse ratio.

FIG. 2 shows the clutch and brake engagement-and-release pattern to establish the various forward driving ratios and the reverse ratio. In FIG. 2 the symbols $B_1$, $B_2$, $C_1$, $C_2$, $C_3$, $C_4$, $C_5$ and $C_6$ are used to designate respectively the overdrive brake band 54, the low and reverse brake band 38, forward clutch 47, reverse clutch 50, direct clutch 46, low reaction clutch 42, intermediate clutch 56 and intermediate coupling 58, respectively. The symbols for the clutches and brakes in FIG. 2 have been applied also to the schematic drawing of FIG. 1 so that the chart can be correlated with the schematic drawing of FIG. 1.

During low speed ratio operation carrier 36 acts as a reaction point since it is anchored either by the brake band $B_2$ or the engaged coupling $C_4$. Clutch $C_1$ is engaged to deliver turbine torque to the small sun gear 28. Sun gear 28 acts also as a torque input element of the gearing during intermediate speed operation as the sun gear 26 acts as a reaction point. Sun gear 26 is anchored by the intermediate clutch or brake $C_5$ and coupling $C_6$. A ratio change to the direct-drive, third-speed ratio is obtained by releasing the brakes and clutch $C_2$ and applying simultaneously clutches $C_1$ and $C_3$ thus establishing a split torque delivery path through the gearing, part of the torque then being distributed through a hydrokinetic torque transfer path and the balance being distributed through a mechanical torque transfer path. During overdrive operation the sun gear 26 acts as a reaction point since it is anchored by the brake $B_1$. The clutch $C_3$ remains applied and the ring gear 30, therefore, is overdriven with respect to the shaft 10.

During reverse drive operation clutch $C_2$ is applied so that sun gear 26 acts as a torque input element. Brake $B_2$ is applied to anchor the carrier, and the other clutches and brakes are released. Thus the ring gear 30 is driven in a reverse direction relative to the direction of rotation of the shaft 10.

Figure 3A:
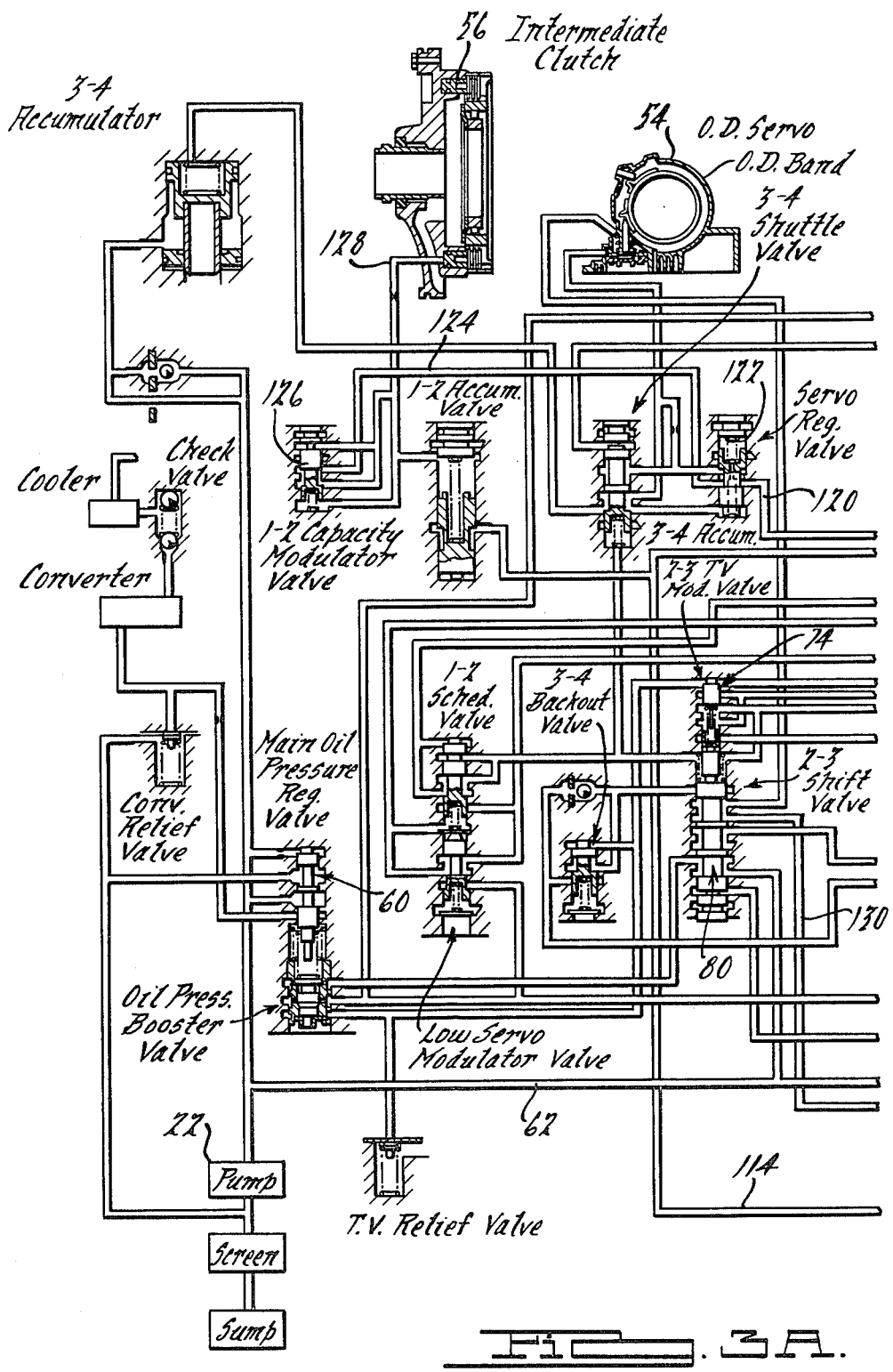
FIGS. 3A and 3B show a schematic representation of a control valve circuit to which the improvements of my invention may apply.
Figure 3B:
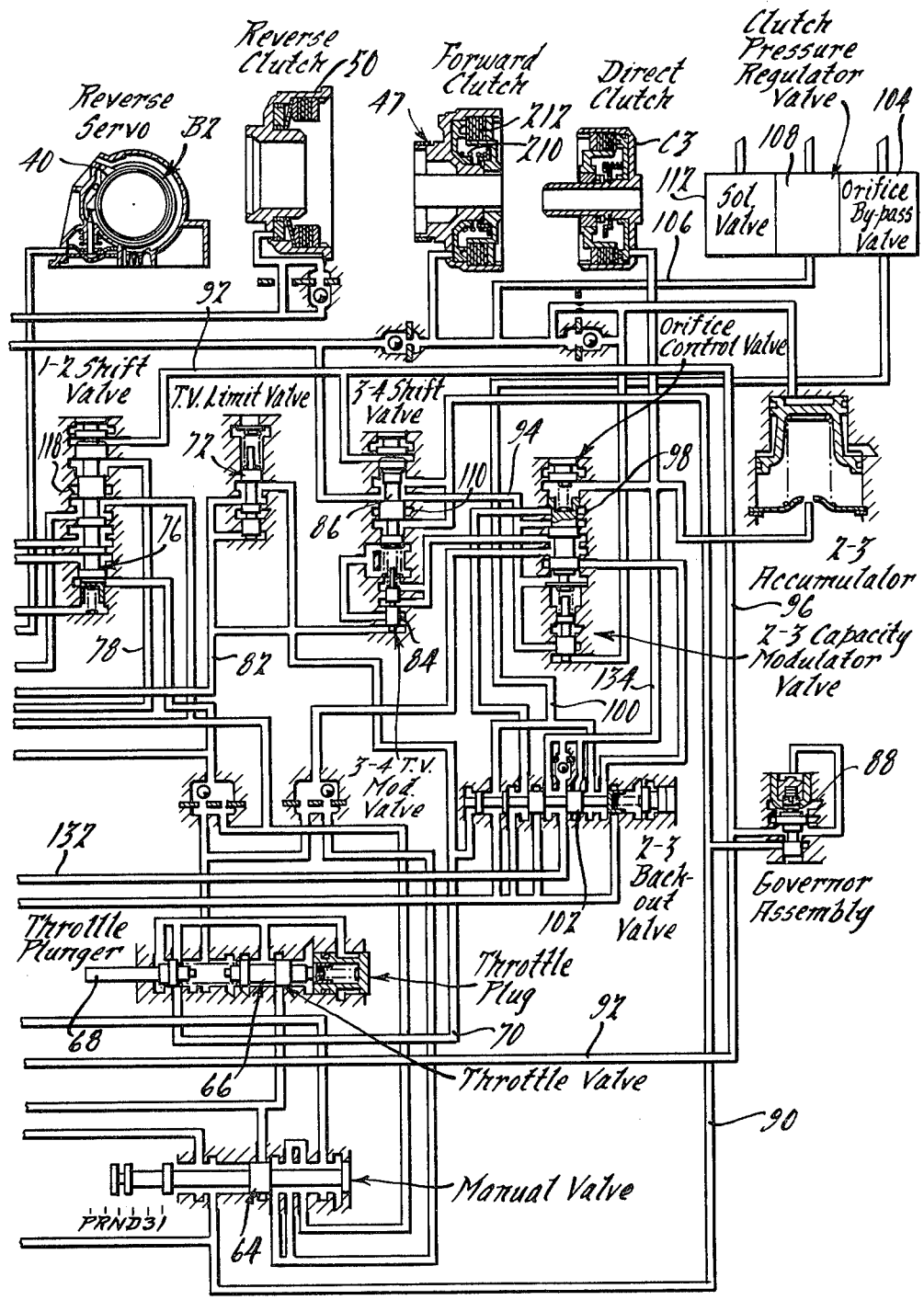

The control circuit for controlling the clutches and brakes of FIG. 1 is shown in FIGS. 3A and 3B. For clarity the left hand side of the circuit for the control system has been shown in FIG. 3A and the right hand side thereof and has been shown in FIG. 3B, but FIGS. 3A and 3B should be treated as a single view. The mode of operation of the circuit of FIGS. 3A and 3B can be found by referring to copending application Ser. No. 82,399, filed Oct. 5, 1979 by A. S. Leonard et al. As seen in FIG. 3A, pump 22 develops a circuit pressure that is regulated by the main oil pressure regulator valve 60. The regulated circuit pressure is distributed through passage 62 to the manual valve 64, which is under the control of the vehicle operator. The various operating positions of the manual valve are indicated in FIG. 3B by the reference notations P, R, N, D, 3 and 1. These positions represent respectively the park position, the reverse position, neutral position, the automatic drive range position, the three speed automatic drive range position and the low-ratio, manual-low position. When the vehicle operates in the manual low position, automatic upshifts are prevented and the brake band 38 or $B_2$ is applied so that carrier 36 can accommodate coasting torque.

A transmission throttle valve 66 in the control circuit is capable of establishing a pressure signal that is related in magnitude to engine torque. It includes a plunger 68 connected to the engine carburetor throttle. The plunger advances against the opposing forces of the valve spring as the engine carburetor throttle is opened. Control pressure distributed to the throttle valve from passage 62 is modulated and distributed to a throttle pressure passage 70. Passage 70 extends to a TV limit valve 72 which establishes an upper limit for the throttle pressure. The output pressure from the TV limit valve 72 is distributed to a 2-3 throttle modulator valve 74. The modulated throttle pressure from valve 74 is distributed to the 1-2 shift valve 76 through passage 78. It is distributed also to the upper end of the 2-3 shift valve 80. The output pressure from the TV limit valve 72, in addition to being transferred though passage 82 to the 2-3 TV modulator valve is transferred to the base of the 3-4 modulator valve 84, the output of the latter acting on the lower end of the 3-4 shift valve 86.

The throttle pressure forces acting on the 1-2 shift valve, the 2-3 shift valve and the 3-4 shift valve are opposed in each case by governor pressure developed by governor assembly 88. Control pressure is distributed to the governor assembly 88 through passage 90 from the manual valve. The output signal from the governor assembly is delivered from governor passage 92 to the lower end of the 2-3 shift valve 80, to the upper end of the 1-2 shift valve 76 and to the upper end of the 3-4 shift valve 86. The shift valves respond to the differential forces of the throttle pressure and the governor pressure to distribute actuating pressures to the clutches and brake servos. When the manual valve 64 is in either the D position or the "3" position, pressure is distributed from the regulated line pressure passage 62 through the manual valve to the passage 90. Passage 90 in turn communicates with passage 94 through the 3-4 shift valve. Passage 94 in turn communicates with passage 96 through the orifice control valve 98. Passage 96 communicates with forward clutch feed passage 100 through the 2-3 backout valve 102. Control pressure is distributed from passage 100 to the orifice bypass valve 104 and then to feed passage 106 through the clutch pressure regulator valve 108. The orifice bypass valve 104 and the clutch pressure regulator valve 108 will be described with reference to FIG. 4. Feed passage 106 communicates with the forward clutch 47.

As seen in FIG. 2, clutch 47, which also carries the symbol $C_1$, is energized during operation in the first three forward driving ratios but is exhausted during operation in the fourth overdrive ratio. The ratio change from the third ratio to the fourth ratio is controlled by the 3-4 shift valve 86. When the governor pressure is sufficient to overcome the opposing forces of the spring and the throttle pressure acting on the 3-4 shift valve passage 94 becomes exhausted through exhaust port 110 in the 3-4 shift valve assembly.

The clutch pressure regulator valve 108 is controlled by a solenoid valve 112 which will be described also with reference to FIG. 4.

Control pressure is distributed from the manual valve to the 1-2 shift valve through passage 114. When the 1-2 shift valve is positioned as shown, the intermediate clutch 56 is exhausted through the port 118 in the 1-2 shift valve assembly, port 118 communicating through passage 120, through the overdrive servo regulator valve 122, through passage 124, through the 1-2 capacity modulator valve 126 and through intermediate clutch feed passage 128. When the governor pressure is sufficient to move the 1-2 shift valve in a downward direction, passage 120 is brought into communication with control pressure passage 114.

Ratio changes from the intermediate ratio to the third speed ratio are controlled by the 2-3 shift valve which receives control pressure from passage 130. When the governor pressure acting on the 2-3 shift valve overcomes the opposing forces of the throttle pressure and the spring on the 2-3 shift valve, the 2-3 shift valve moves in an upward (upshift) direction thereby causing passage 130 to communicate with passage 132 which distributes control pressure through the 2-3 backout valve 102 to the feed passage 134 for the direct clutch $C_3$.

The drawing of FIG. 4 shows in more detail the functioning of the solenoid valve 112, the clutch pressure regulator valve 108 and the orifice bypass valve 104. These are capable of exhausting the forward clutch 47 to condition the driveline for neutral during idle and coast conditions. The orifice bypass valve and the clutch pressure regulator valve are situated in the feed passage for the forward clutch 47. The feed passage, as indicated in FIG. 3B, is designated by reference character 100. Passage 106 is an extension of feed passage 100 and it communicates, as shown in FIG. 3B, directly with the forward clutch 47.

The clutch pressure regulator valve comprises a double land valve spool 140 having valve lands 142 and 144. These are positioned in valve chamber 146. Passage 106 communicates with the chamber 146 at a location between the valve lands 142 and 144. Feedback passage 148 extends to the right hand side of the valve land 144 and creates a pressure feedback force on the valve spool that opposes the force of valve spring 150 which acts in a right hand direction on the valve spool 140. The valve spool 140 regulates the pressure that is applied to the clutch pressure regulator valve through passage 152, the latter communicating with the chamber 146 at a location adjacent land 144. To effect modulation the chamber 146 is vented at 154.

Pressure in passage 152 is on the output side of the orifice bypass valve shown at 154. This valve comprises a double land valve spool 156 having a large valve land 158 and a smaller land 160. Spool 156 is situated in valve chamber 162. Passage 100 communicates with chamber 162 at a location intermediate lands 158 and 160. Spool 156 normally is positioned in a right hand direction by valve spring 164 received in the left hand end of valve chamber 162. Vent port 166 opens the left hand end of chamber 162 to exhaust.

When the valve spool 156 is positioned in a right hand direction, the vented spring chamber at the left hand end of the chamber 162 communicates with the right hand end of land 154 through cross over passage 168. Pressure in passage 100 is distributed to the valve chamber through parallel passages 170 and 172, the latter containing a flow restricting feed orifice 174. When the valve spool 156 is moved in a right hand direction, the feed pressure from passage 100 is distributed through the orifice 174 to the passage 152. When the valve spool 156 is moved in a left hand direction, orifice 174 is bypassed as fluid is distributed from passage 100 and through the passage 170 to the passage 174.

Pressure on the upstream side of the orifice 174 is distributed to the spring chamber for spring 150 at the left hand side of the clutch pressure regulator valve spool 140 through passage 176.

Solenoid valve 178 comprises a valve chamber 180 which is surrounded by solenoid valve field coil 182. A shiftable valve element 184 is positioned in the valve chamber 180. It is spring biased in the left hand direction by valve spring 186.

Valve element 184 has a valve nose 188 on the left hand end thereof and a valve nose 190 on the right hand end thereof. Valve spring 186 normally urges the valve element 184 in a left hand direction thus sealing vent port 192 which communicates with passage 194. During operation in the forward drive mode with the manual valve in either the "D" position or the "3" position, passage 194 is vented through passages not shown. When the manual valve is moved to the low position "1", passage 194 is pressurized as communication is established between passage 62 and the passage 94. At that time valve element 184 is urged in a right hand direction so that valve nose 190 seals pressure port 196 which communicates with the passage 176. When the passage 196 is vented, the valve is shifted in the left hand direction thus establishing communication between passage 176 and the left hand end of the clutch pressure regulator valve element 140 through communicating valve port 198 and valve port 196.

Solenoid winding 182 is in a solenoid circuit that includes voltage line 200. Accelerator pedal 204, when it is in a zero engine throttle position, establishes contact with an electrical contact for breaker switch 206 which completes the circuit for voltage source 202. The other end of the solenoid windings in the schematic drawings of FIG. 4 is connected to the ground side of the voltage source 202.

Accelerator pedal 204 is connected to transmission throttle valve 66 through a mechanical linkage 208. When the engine throttle is closed, the solenoid valve is effective to vent the end of the clutch pressure regulator valve so that the clutch pressure regulator valve spool 140 will regulate the pressure made available to the clutch piston through passage 106. The calibration of the clutch pressure regulator valve is such that the release springs shown schematically at 210 in FIG. 3B, are compressed and the clearance between the clutch plates 212 is eliminated. The plates thus are barely touching but there is very little torque transmitting capacity. When the driver depresses the accelerator pedal, the solenoid circuit is opened and the solenoid valve pressurizes the end of the clutch pressure regulator valve. As communication is reestablished between passage 176 and port 198, the pressure on the clutch piston of the forward clutch 47 increases instantly to the line pressure level maintained by the pressure regulator valve 60 thus engaging the clutch. There is no time delay during clutch application since there is no takeup clearance in the clutch.

Most automatic transmissions currently employed in vehicle drivelines use an orifice in the feed passage for the forward clutch. This restricts the flow to the clutch and causes it to engage smoothly during shifts from the neutral condition to the forward drive modes. Although this smooths the engagement, it also delays the engagement of the clutch. This delay is inconsistent with the attempt described with reference to FIG. 4 to engage the clutch quickly.

The orifice bypass valve is effective to bypass the orifice 174 for quick engagement in the drive range. Although it is effective to delay clutch application and cushion the forward clutch engagement on transitions from neutral to drive. If the transmission is operating in the neutral mode, the bypass valve is pushed to the right by the valve spring 164. When the transmission is shifted into the drive mode, the clutch is fed through the orifice; and as pressure builds up, it acts on the small area of the differential lands 156 and 160. The valve spring force is such that the clutch pressure nearly reaches line pressure before the spring force is overcome so the orifice acts to cushion the clutch engagement. When the pressure overcomes the spring force, it moves the valve to the left thus bypassing the orifice. When the valve is positioned to the left, pressure acts also on the end of the valve so that much less pressure is required to hold the spring compressed. Forward drive pressure will hold the orifice bypass valve in the orifice bypass position until the driver again selects neutral.

When the manual valve is positioned in the "1" position, passage 194 is pressurized so that the left hand end of the clutch pressure regulator valve spool 140 is pressurized. This makes it impossible for the clutch feed passage 106 to be vented through vent port 154 thus assuring that the transmission will be in condition for hill braking.

Having described a preferred embodiment of my invention, what I claim and desire to secure by U.S. Letters Patent is:

1. An automatic transmission control system for a multiple ratio transmission in an automotive vehicle driveline having an internal combustion engine;

multiple ratio gearing establishing torque delivery paths between the engine and a transmission driven member;

fluid pressure operated clutches and brakes for controlling the relative motion of the gear elements to establish various operating modes, one clutch being adapted to be engaged to complete a torque delivery path during operation in serveral forward driving ratios;

a pressure source;

control pressure passages connecting the pressure source with said clutches and brakes;

shift valves for selectively distributing pressure to said clutches and brakes to effect ratio changes;

a manual valve in said circuit for controlling distribution of pressure to said shift valves and to said clutch;

a clutch pressure regulator valve communicating with said clutch for regulating the magnitude of the pressure acting on said clutch;

driver controlled valve means for overruling the regulating action of said clutch pressure regulator valve when the engine carburetor throttle is advanced;

said control system includes an orifice bypass valve located between said manual valve and said clutch pressure regulator valve;

said orifice bypass valve including a clutch feed orifice and a clutch feed bypass passage in parallel disposition with respect to said clutch feed orifice; and said orifice bypass valve including a shiftable valve element responsive to pressure in said clutch to selectively open and close said bypass passage in response to control pressure distributed to said clutch when said manual valve is moved from a neutral position to a clutch engaging position.

2. An automatic transmission control system for a multiple ratio transmission in an automotive vehicle driveline having an internal combustion engine;

multiple ratio gearing establishing torque delivery paths between the engine and a transmission driven member;

fluid pressure operated clutches and brakes for controlling the relative motion of the gear elements to establish various operating modes, one clutch being adapted to be engaged to complete a torque delivery path during operation in several forward driving ratios;

a pressure source;

control pressure passages connecting the pressure source with said clutches and brakes;

shift valves for selectively distributing pressure to said clutches and brakes to effect ratio changes;

a manual valve in said circuit for controlling distribution of pressure to said shift valves and to said clutch;

a clutch pressure regulator valve communicating with said clutch for regulating the magnitude of the pressure acting on said clutch;

driver controlled valve means for overruling the regulating action of said clutch pressure regulator valve when the engine carburetor throttle is advanced;

said driver controlled valve means comprising a solenoid valve having a solenoid circuit with a breaker switch under the control of the vehicle operator;

said circuit being energized when the engine carburetor throttle is relaxed to a zero throttle position and opened when the engine carburetor throttle is advanced;

said solenoid valve shifting from one position to another in response to the opening and closing of said solenoid circuit thus selectively venting and pressurizing said clutch pressure regulator valve thus activating it to effect a threshold pressure level in said clutch when said engine carburetor throttle is relaxed to a coasting or zero throttle position.

3. An automatic transmission control system for a multiple ratio transmission in an automotive vehicle driveline having an internal combustion engine;

multiple ratio gearing establishing torque delivery paths between the engine and a transmission driven member;

fluid pressure operated clutches and brakes for controlling the relative motion of the gear elements to establish various operating modes, one clutch being adapted to be engaged to complete a torque delivery path during operation in several forward driving ratios;

a pressure source;

control pressure passages connecting the pressure source with said clutches and brakes;

shift valves for selectively distributing pressure to said clutches and brakes to effect ratio changes;

a manual valve in said circuit for controlling distribution of pressure to said shift valves and to said clutch;

a clutch pressure regulator valve communicating with said clutch for regulating the magnitude of the pressure acting on said clutch;

driver controlled valve means for overruling the regulating action of said clutch pressure regulator valve when the engine carburetor throttle is advanced;

said control system including an orifice bypass valve located between said manual valve and said clutch pressure regulator valve;

said orifice bypass valve including a clutch feed orifice and a clutch feed bypass passage in parallel disposition with respect to said clutch feed orifice;

said orifice bypass valve including a shiftable valve element responsive to pressure in said clutch to selectively open and close said bypass passage in response to control pressure distributed to said clutch when said manual valve is moved from a neutral position to a clutch engaging position;

said driver controlled valve means comprising a solenoid valve having a solenoid circuit with a breaker switch under the control of the vehicle operator;

said circuit being energized when the engine carburetor throttle is relaxed to a zero throttle position and opened when the engine carburetor throttle is advanced;

said solenoid valve shifting from one position to another in response to the opening and closing of said solenoid circuit thus selectively venting and pressurizing said clutch pressure regulator valve thus activating it to effect a threshold pressure level in said clutch when said engine carburetor throttle is relaxed to a coasting or zero throttle position.

* * * * *